United States Patent
Vargas et al.

(10) Patent No.: US 12,014,382 B2
(45) Date of Patent: Jun. 18, 2024

(54) SYSTEMS AND METHODS FOR TREND DETECTION

(71) Applicant: Capital One Services, LLC, McLean, VA (US)

(72) Inventors: Cruz Vargas, Alexandria, VA (US); Adam Vukich, Alexandria, VA (US); George Bergeron, Falls Church, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 373 days.

(21) Appl. No.: 16/847,970

(22) Filed: Apr. 14, 2020

(65) Prior Publication Data
US 2021/0319458 A1     Oct. 14, 2021

(51) Int. Cl.
*G06Q 30/0201* (2023.01)
*G06F 18/214* (2023.01)
*G06F 18/23213* (2023.01)

(52) U.S. Cl.
CPC ..... *G06Q 30/0201* (2013.01); *G06F 18/2155* (2023.01); *G06F 18/23213* (2023.01)

(58) Field of Classification Search
None
See application file for complete search history.

(56) References Cited

U.S. PATENT DOCUMENTS

| | | |
|---|---|---|
| 6,871,183 B2 | 3/2005 | Gilday et al. |
| 10,140,666 B1 | 11/2018 | Wang et al. |
| 10,229,447 B2 | 3/2019 | Bogle et al. |
| 10,521,820 B1 * | 12/2019 | Jarvis ................. G06Q 30/0255 |
| 2003/0078850 A1 | 4/2003 | Hartman et al. |
| 2004/0107129 A1 | 6/2004 | Langen |
| 2005/0027639 A1 | 2/2005 | Wong |
| 2006/0031177 A1 | 2/2006 | Rule |
| 2009/0083128 A1 * | 3/2009 | Siegel .................... G06Q 30/02 705/7.34 |

(Continued)

FOREIGN PATENT DOCUMENTS

| | | |
|---|---|---|
| CA | 2811408 A1 | 7/2014 |
| EP | 1402435 A2 | 3/2004 |

(Continued)

OTHER PUBLICATIONS

Guo et al, Harnessing the Power of the General Public for Crowdsourced Business Intelligence: A Survey (Year: 2019).*

*Primary Examiner* — Mohamed N El-Bathy
(74) *Attorney, Agent, or Firm* — HUNTON ANDREWS KURTH LLP

(57) ABSTRACT

A machine learning model supported trend detection engine can be available via an application programming interface to business or community planners to evaluate the potential for new plans or ventures. The model can be based upon transaction trends and available merchant data from transactions such as location, time, merchant type, and transactions history longevity from particular retailers. The model can generate a dashboard that shows past performance, predicted future performance, trends, similarity between businesses, and profitability. The new plan or venture can be correlated with other retailers that have been established and successful under a similar model and located near another retailer similar to the new plan or venture.

20 Claims, 11 Drawing Sheets

(56) References Cited

U.S. PATENT DOCUMENTS

| | | | |
|---|---|---|---|
| 2010/0198630 A1 | 8/2010 | Page et al. | |
| 2011/0166976 A1* | 7/2011 | Krein | G06Q 40/00 |
| | | | 707/E17.014 |
| 2012/0143641 A1 | 6/2012 | O'Brien | |
| 2012/0239523 A1 | 9/2012 | Ouimet et al. | |
| 2012/0239524 A1 | 9/2012 | Ouimet et al. | |
| 2013/0073345 A1 | 3/2013 | Pieper et al. | |
| 2013/0282604 A1* | 10/2013 | Shukla | G06Q 10/101 |
| | | | 705/319 |
| 2014/0019293 A1 | 1/2014 | Brownley et al. | |
| 2014/0136293 A1* | 5/2014 | Ramakrishnan | |
| | | | G06Q 10/06375 |
| | | | 705/7.37 |
| 2014/0214695 A1 | 7/2014 | Konchitsky | |
| 2015/0073964 A1 | 3/2015 | Peichl et al. | |
| 2015/0324715 A1 | 11/2015 | Nelson et al. | |
| 2016/0155070 A1 | 6/2016 | Hoover et al. | |
| 2016/0267396 A1* | 9/2016 | Gray | G06N 20/00 |
| 2017/0178167 A1 | 6/2017 | Tiwary et al. | |
| 2017/0278027 A1 | 9/2017 | Wei et al. | |
| 2018/0032855 A1 | 2/2018 | Wang et al. | |
| 2018/0089594 A1* | 3/2018 | Duncker | G06N 7/01 |
| 2018/0114128 A1* | 4/2018 | Libert | G06Q 10/00 |
| 2019/0147468 A1* | 5/2019 | Elias | G06F 7/026 |
| | | | 705/7.34 |
| 2019/0147469 A1* | 5/2019 | Hu | G06F 16/353 |
| | | | 705/7.34 |

FOREIGN PATENT DOCUMENTS

| | | | |
|---|---|---|---|
| EP | 2226750 A1 | 9/2010 | |
| WO | 2016085524 A1 | 6/2016 | |
| WO | WO-2017027718 A1 * | 2/2017 | |
| WO | WO-2019190924 A1 * | 10/2019 | G06N 3/08 |

\* cited by examiner

SYSTEMS AND METHODS FOR TREND DETECTION

FIELD OF THE DISCLOSURE

The present disclosure generally relates to data processing, artificial intelligence (AI) modeling, and machine learning, and, in particular, to systems and methods for trend detection.

BACKGROUND

Businesses are tied to their local communities. When neighborhoods undergo economic and social changes, small businesses can face a threat or a boon. For example, gentrification is associated with both business retention and disruption and so, the results of gentrification can be mixed. Many businesses stay in place over time. For those businesses that leave gentrifying neighborhoods, their spaces tend to sit vacant for long periods of time. Gentrifying neighborhoods are more likely to attract new types of businesses than non-gentrifying and higher-income neighborhoods and often attract chains to replace displaced businesses.

Changes in the nature and quality of neighborhoods is determined in part by the commercial enterprises that serve the community. Business location decisions and the survival of businesses are a function of the existing and potential consumer base in an area. A shift in the consumer base could mean several things for local businesses. These changes could be a boon for local businesses, if they bring in new consumers; however, if the new consumers have different tastes and higher rents, then incumbent businesses could suffer. The issue of business turnover and displacement can bring both opportunities and threats.

Historically, small businesses have played an important role and have been considered a vehicle for entrepreneurship. Retail change can be a harbinger of broader trends that have thus far been underappreciated. Social changes can bring new services and access to a wider choice of basic goods, safer streets, and employment opportunities. However, social and economic change can also disrupt commercially-driven neighborhood identities and introduce services and products that do not serve incumbent residents. The consumer base and costs of operation for a local business can shift over time.

As one example, gentrification can cause changes in consumer demand. For existing businesses, a new pool of local residents could mean both more and less patronage. If the local consumer base has tastes that do not align with the services or goods that existing establishments provide, then local businesses could suffer. On the other hand, new residential activity could be a stabilizing force if it provides an injection of cash flow that the neighborhood was previously lacking. In addition, socioeconomic changes can draw new businesses and services into a neighborhood.

Gentrification can cause changes in start-up and operating costs. For existing businesses, the effect is direct: due to increased demand for the area, rents can increase. Without a concomitant increase in revenues, the costs of operating could become unsustainable and force closure. The pressures from rising commercial rents can take a different form than residential ones. Commercial leases tend to be longer and therefore businesses can often sustain operations at the original, lower rents so that displacement of businesses could lag behind displacement of residents. Rising rents and new investments can influence the kinds of businesses that opt into the neighborhood, and by association, the range and prices of products that they sell. Alternatively, higher rents can also deter entry, leaving vacated commercial spaces empty for sustained periods of time.

Initially low-valued neighborhoods that experience faster price appreciation and/or larger income gains tend to get more retail establishments. Retail revitalization is strongly associated with gains for middle-income neighborhoods for independent or local chain businesses. While there is more business churn in neighborhoods undergoing relative price appreciation, most of it is driven by new business births rather than business deaths or exits. Retail churn is associated more with changes in the local consumer profile than in the commercial environment. Changes in local businesses are also driven by targeted investment.

Social and economic changes have mixed results and can be a threat or a boon to businesses. Accordingly, there are significant, and competing, needs to detect trends for existing businesses in an area that can affect the growth and success of a new business in the area.

SUMMARY

The disclosed subject matter is directed to systems and methods for trend detection that satisfy these needs.

An example embodiment of the present disclosure can be a system including a processor and a database that is in data communication with the processor. The processor can be configured to provide a trend detection interface. The database can contain transaction data. The transaction data can include a location, a time, a merchant type, and a transaction history longevity from each retailer. The processor can be configured to perform a process. A dataset can be selected from the transaction data based on a first business and a first location. A trend recognition model can be trained on the dataset, where the training includes pattern recognition based on the first business and the first location. A trend report can be generated using the trend recognition model, where the trend report identifies one or more trends associated with the first business and the first location, a measure of similarity between the first business and a second business, and an indication of profitability of the second business. The trends can include a correlation of the first business with a second business and a correlation strength indicator. The trend recognition model can be trained using supervised or unsupervised learning. The indication of profitability can include revenue data, expenditure data, profit margin data, and growth data. The trend recognition model can be configured to compare the correlation strength indicator to a threshold prior to identifying the at least one of the one or more trends in the trend report. The trend report can include an indication of growth of the first business and the second business. The trend report can include a comparison of the first location with a second location. The dataset can include retail transaction data, consumer credit data, and business plan data.

An example embodiment of the present disclosure can be a method. A dataset can be generated for training a model to detect a correlation of a first business with a second business. The dataset can include a location, a time, a merchant type, and a transactions history longevity from each retailer. The model can be trained on the dataset. The model can be used to generate a dashboard. The dashboard can show past performance of the first business and a second business and predicted future performance of the first business and the second business. The dashboard can identify one or more trends associated with the first business and the second business, a measure of similarity between the first business and the second business, and an indication of profitability of the second business. At least one of the one or more trends can include the correlation of the first business with the second business and a correlation strength indicator. The first business and the second business can have similar business models. The first business and the second business can share a customer base in a market. The first business and the second business can be located in a first area. The past performance of the first business and the second business can be in the first area and the future performance of the first business and the second business can be in a second area. The model can use k-means clustering. The model can be trained using supervised or unsupervised learning. The dataset can be selected from merchant transaction data, location data, consumer credit data, and business plan data.

An example embodiment of the present disclosure can be a non-transitory computer-accessible medium having stored thereon computer-executable instructions, wherein upon execution by a computer arrangement comprising a processor, the instructions cause the computer arrangement to perform procedures. A dataset can be generated for training a model to detect a correlation of a first business with a second business. The dataset can include a location, a time, a merchant type, a transaction history, and a transaction history longevity from each retailer. The model can be trained on the dataset. The model can be used to generate a dashboard. The dashboard can show past performance of the first business and the second business and predicted future performance of the first business and the second business. The dashboard can identify one or more trends associated with the first business and the second business, a measure of similarity between the first business and the second business, and an indication of profitability of the second business. At least one of the one or more trends can include the correlation of the first business with the second business and a correlation strength indicator. The first business and the second business can have similar business models. The first business and the second business can share a customer base in a market. The first business and the second business can be located in a first area. The past performance of the first business and the second business can be in a first area and the future performance of the first business and the second business can be in a second area. The model can use k-means clustering. The dataset can be selected from merchant transaction data, location data, consumer credit data, and business plan data.

These and other features, aspects and advantages of the disclosed subject matter are explained in greater detail with reference to specific example embodiments that are illustrated in the following description, appended claims, and accompanying drawings.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
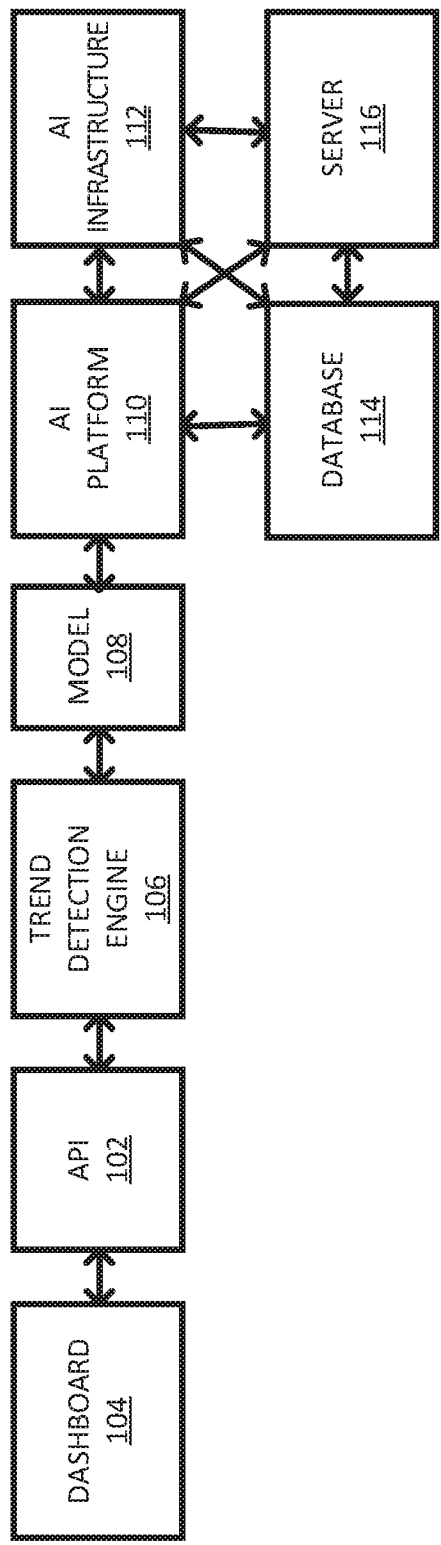
FIG. 1 is a diagram of a system for trend detection, according to an example embodiment of the disclosure.

FIG. 1 is a diagram of a system 100 for trend detection, according to an example embodiment of the disclosure. A trend detection engine 106 can be available via an application programming interface (API) 102 to various users such as a business analyst, a lender, a community planner, a business or other user of a network-enabled computer to evaluate the potential for a new business plan or venture. The API 102 can provide access to useful features of the trend detection engine 106 such as discoveries from a model 108. The model 108 can support the trend detection engine 106. The model 108 can be trained on a dataset to detect trends based upon transaction trends and available merchant data from transactions such as location, time, merchant type, and transactions history longevity from particular retailers. Once the model 108 is trained, it can be used by the trend detection engine 106. The trend detection engine 106 can perform pre-processing and post-processing before and after using the model 108 The trend detection engine 106 can use information from the model 108 and other sources to generate a dashboard 104 that shows past performance, predicted future performance, trends, similarity between businesses, and profitability. The dashboard 104 can be made available to users such as analysts and partners via the API 102 based on output from the trend detection engine 106. The dashboard 104 can show how the new business plan or venture is correlated with other retailers that have been established and successful under a similar business model and located near another retailer similar to the new business plan or venture. The model 108 can be built, trained and refreshed with feedback using an AI platform 110, AI infrastructure 112, a database 114, and a server 116.

The model 108 can be a machine learning model generally capable of performing data mining in the database 114 and recognizing patterns in data for prediction, explanation and understanding of a competitive marketplace. The model 108 can recognize patterns in large and complex data that would be impossible or overwhelming for a person to do. The resulting patterns can be used by a person in prediction, explanation and understanding without having to look at the underlying data. The model 108 can be a machine learning model such as a rule inferencer, a probabilistic model, a decision tree, a covering method, classification rules, association rules, a linear model, instance-based learning, clustering, multi-instance learning. The model 108 can be a Bayesian network, a clustering method, a hidden variable model, a graphical model, a factor graph, a conditional probability model such as a linear and polynomial regression model and a hidden markov model. The model 108 can be a deep learning method such as a deep feedforward network, a convolutional neural network, a stochastic deep network, or a recurrent neural network. The model 108 can use supervised learning, unsupervised learning, semi-supervised learning, and ensemble learning. The model 108 can use a k-nearest neighbors method, a k-means clustering method, a naïve Bayes classifier, a random forest method, or an artificial neural network. The model 108 can use various AI methods to achieve the end goal of community development prediction. For example, an unsupervised implementation can use clustering algorithms such as k-means. The clustering algorithm can generally be either divisive or Agglomerative, meaning starting with one large cluster and breaking up the data into smaller clusters or starting with smaller clusters and looking for similarities respectively.

The AI platform 110 and the AI infrastructure 112 can be any kind of hardware architecture, software framework and predictive analytics tools, for building and running the model 108. The AI platform 110 can be a private or an open-source platform such as Google® Kubeflow and TensorFlow, Amazon® Sagemaker, Microsoft® Azure, or IBM® power systems for AI. The AI platform 110 and AI infrastructure 112 can include network-enabled computers such as a distributed systems cluster. The database 114 can be any organized data storage such as a relational database or data warehouse and can store big data, i.e., large volumes of data from a diversity of sources. The database 114 can be a network-enabled computer that is part of the AI infrastructure 112 and/or the server 116. The server 116 can be a network-enabled computer that is part of the AI infrastructure 112 and/or the AI platform 110.

The AI infrastructure 112 can include components for data acquisition, preparation and feature engineering, model training and evaluation, and deployment, inference and monitoring. For data acquisition, preparation and feature engineering, the AI infrastructure 112 can include feature store, metadata store, feature engineering, data transformation, data validation, versioning, pipeline storage, streaming, and data ingest. For model training and evaluation, the AI infrastructure 112 can include configuration, experiment management, tuning or optimization, machine learning frameworks, distributed computing frameworks, cluster management, system software, and hardware. For deployment, inference and monitoring, the AI infrastructure 112 can include observability, monitoring, and logging tools and serving infrastructure.

As referred to herein, a network-enabled computer may include, but is not limited to a computer device, or communications device including, e.g., a server, a network appliance, a personal computer, a workstation, a phone, a handheld computer, a personal digital assistant, a thin client, a fat client, an Internet browser, a mobile device, or other device. For example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

A network-enabled computer can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein.

A network-enabled computer can include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user's device that is available and supported by the user's device, such as a touch-screen, keyboard, mouse, cursor-control device, touch-screen, microphone, digital camera, video recorder or camcorder. These devices can be used to enter information and interact with the software and other devices described herein. In some examples, the network-enabled computer can execute one or more applications, such as software applications, that enable, for example, network communications with one or more components of the system and transmit and/or receive data.

A network-enabled computer can be a client device in communication with one or more servers via one or more networks, and can operate as a respective front-end to back-end pair with the server. A client device can transmit, for example from a mobile device application executing on the client device, one or more requests to the server. The one or more requests can be associated with retrieving data from the server. The server can receive the one or more requests from the client device. Based on the one or more requests from the client device, the server can be configured to retrieve the requested data from one or more databases. Based on receipt of the requested data from the one or more databases, the server can be configured to transmit the received data to the client device. For example, the received data can be responsive to one or more requests.

The network can be one or more of a wireless network, a wired network or any combination of wireless network and wired network, and can be configured to connect the client device to the server. For example, the network can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

The network can include, without limitation, telephone lines, fiber optics, IEEE Ethernet 902.3, a wide area network, a wireless personal area network, a LAN, or a global network such as the Internet. The network can support an Internet network, a wireless communication network, a cellular network, or the like, or any combination thereof. The network can further include one network, or any number of the exemplary types of networks mentioned above, operating as a stand-alone network or in cooperation with each other. The network can utilize one or more protocols of one or more network elements to which they are communicatively coupled. The network can translate to or from other protocols to one or more protocols of network devices. Although the network is depicted as a single network, it should be appreciated that according to one or more examples, the network can comprise any number of interconnected networks, such as, for example, the Internet, a service provider's network, a cable television network, corporate networks, such as credit card association networks, and home networks.

Figure 2:
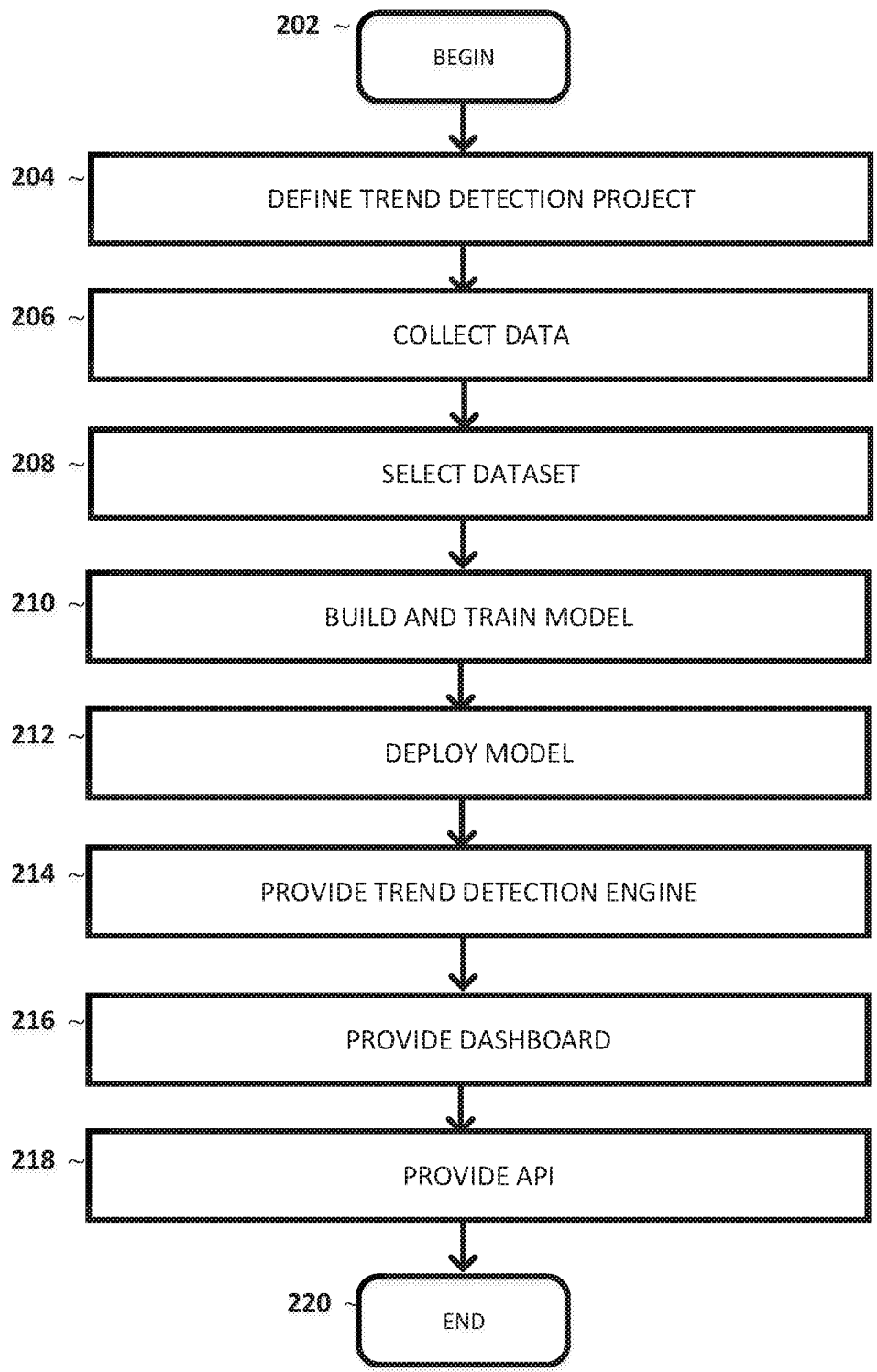
FIG. 2 is a flow chart of a method for trend detection, according to an example embodiment of the disclosure.

FIG. 2 is a flow chart of a method 200 for trend detection, according to an example embodiment of the disclosure. Method 200 begins at block 202. At block 204, a trend detection project is defined for users. For example, the trend detection project can be defined as using an AI model to discover trends that can help the lender make decisions for small business credit and loan applications in changing neighborhoods.

At block 206, data is collected. For example, it can be determined what data might be relevant, whether it is available, and whether any pre-processing is needed for the trend detection project. Relevant and available data can be collected from various sources, provided to and stored in databases, AI platforms, and AI infrastructure.

At block 208, a dataset is selected. For example, a dataset can be selected in light of understanding the business problem, understanding the data, acquiring the data, preparing the data, and selecting a portion of the available data as a dataset. The dataset can be used in model development and training.

At block 210, a model is built and trained. Using the selected dataset, the model can be built and trained. The model can involve, for example, decision trees, random forest, gradient boosting trees, support vector machines, neural networks, or other machine learning or other AI techniques or methods. The model can be used to identify patterns in the data to assist users such as a lender in making more accurate return on investment predictions and credit risk estimations for small business loans. The model can be built and run on an AI platform and/or AI infrastructure including a database holding the selected dataset. The data scientist, domain expert, and/or developer can interpret and communicate the model outcomes and refine the model and dataset until it is ready for deployment.

At block 212, the model is deployed. The model can be deployed to support a trend detection engine, which displays outcomes on a dashboard and is made available to users via an API. The trend detection engine can perform pre-processing and post-processing before and after using the model, such as providing feedback and refining results and incorporating information from other sources. At block 214, a trend detection engine is provided. The trend detection engine can perform data processing using outcomes from the model. At block 216, a dashboard is provided and at block 218, an API is provided. For example, a lender can use the API to help make decisions for small business credit and loan applications in changing neighborhoods using the information about trends detected by the trend detection engine and information displayed on the dashboard. The dashboard can include or provide access to other information relevant to the lender's decision and other business processes, such as business plans and forecasting models. Method 200 ends at block 220.

Figure 3:
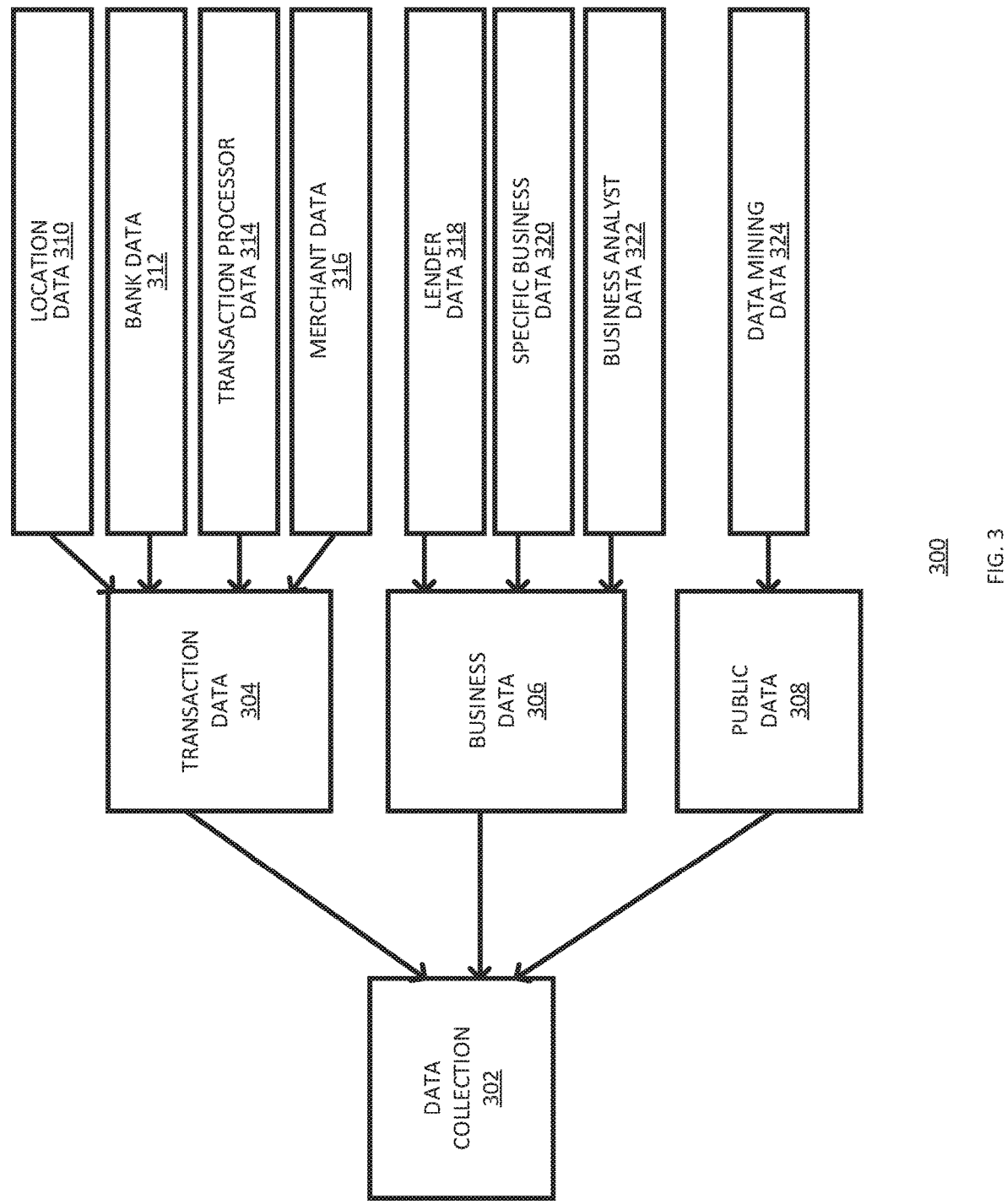
FIG. 3 is a diagram of a system for data collection, according to an example embodiment of the disclosure.

FIG. 3 is a diagram of a system 300 for data collection 302, according to an example embodiment of the disclosure. Data collection 302 includes collecting various kinds of data such as transaction data 304, business data 306, public data 308 and other kinds of data. The transaction data 304 can be collected from various sources and include data such as location data 310, bank data 312, transaction processor data 314, or merchant data 316. The business data 306 can be collected from various sources and include data such as lender data 318, specific business data 320, or business analyst data 322. The public data 308 can be collected from various sources using data mining tools and include data mining data 324. Data collection 302 can rely on third party APIs such as weather data provided by the National Oceanic and Atmospheric Administration (NOAA) on websites using web services, e.g., https://www.ncdc.noaa.gov/cdo-web/webservices/v2. Public data can be collected by scraping data from publicly available sources, such as parsing the HTML of a public business website in order to determine its industry or type of business. Scraping data can be done using tools like JavaScript or another frontend development language or performed using any programming paradigm or language. The data collection 302 for system 300 can include processing so that data is anonymized, protected for privacy and security concerns, and otherwise processed. A dataset for training a model can be selected from the data collection 302.

The transaction data 304 for consumer transactions can include data such as a cardholder name, city, country, email, phone, postal code, state, street address, goods and/or services purchased, total purchase amount, account number, card type, expiration date, security code, merchant type, and other data. The transaction data 304 for loans can include down payment, installments, intervals, period, start date, and other data.

The transaction data 304 can include location data 310. The location data 310 can include data from transactions can include information about where the transaction occurred such as at retail stores or restaurants in a strip mall. The location data 310 can include data from company databases, the Global Positioning System (GPS), maps, location services, or publicly available databases. The location data 310 can be a kiosk, a website or an online auction, for example.

The transaction data 304 can include bank data 312. The bank data 312 can include a large number of transactions by customers of various businesses who use one of the bank's payment methods such as a credit card or debit card in transactions. The bank data 312 can include data related to business loans and business accounts.

The transaction data 304 can include transaction processor data 314. The transaction processor data 314 can be data from a third party company appointed by a merchant to process transactions from various channels such as credit cards and debit cards.

The transaction data 304 can include merchant data 316. The merchant data 316 can include data associated with consumer or business-to-business transactions such as amount, date, merchant category code (MCC), supplier or retailer name, sales tax amount, customer's accounting code, merchant's tax ID number, business status, zip code, quantities, product codes, product descriptions, ship to zip code, freight amount, duty amount, order number, unit of measure, discount, and other line item or invoice details.

The business data 306 can include lender data 318. The lender data 318 can include data from business accounts, business loans, business models, business plans, loan applications, and other data related to loans.

The business data 306 can include specific business data 320. The specific business data 320 can include data about its capacity such as business models, infrastructure, key expertise, competitiveness, customer base, potential growth, technological advantage. The specific business data 320 can include information about its capital ratio, collateral and loan guarantors, credit report, credit score, and payment record.

The business data 306 can include business analyst data 322. The business analyst data 322 can include data for evaluating a borrower's credit risk, assessing the capacity and motivation of the borrower to repay the loan and assessing the lender's protection against losses if the borrower defaults. The business analyst data 322 can include metrics such as credit ratings, the probability of default, and the expected loss given default.

The public data 308 can include data mining data 324. The public data 308 can include economic conditions such as business cycle, growth rate, unemployment rate, inflation rate, interest rate, tariffs, regulations, financial cycle, industry wide factors, and geography.

Many different trends about the successfulness of a business can be detected by a trend detection engine from transaction data 304, business data 306, and public data 308. If many of the bank's customers are spending money at a particular business, then that business is likely experiencing some degree of success by drawing customers in and bringing in revenue. If customers tend to be repeat customers that can show that the business is successful. In contrast, if customers perform a transaction with a business once and never again, that can show that the business is not doing well. If customers tend to shop at one business and then at another business nearby, that can be a trend. Conversely, if customers shop at one business and do not shop at nearby business, that can also be a trend. The amount of time customers spend shopping and how much they spend at a business can also show trends. Trends relating to patterns of types of businesses near each other and shared customer bases can be detected. In addition, trends can be detected using AI that may not be detectable by a human because of the volume of data or the subtleness or unexpected nature of trends or correlations. Trends detected by the trend detection engine can be displayed on a dashboard.

Figure 4:
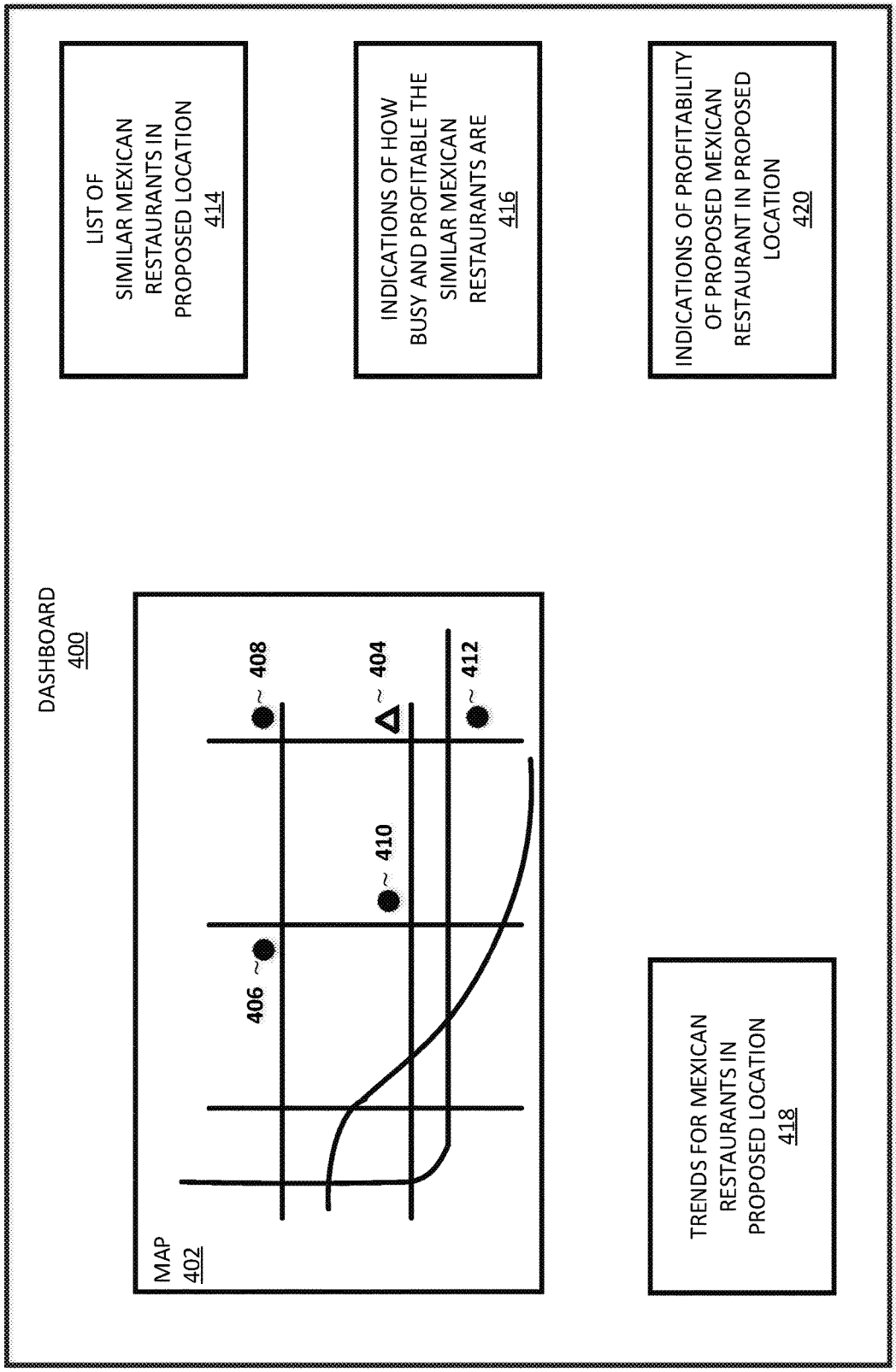
FIG. 4 is a diagram of a dashboard showing detected trends, according to an example embodiment of the disclosure.

FIG. 4 is a diagram of a dashboard 400 showing detected trends, according to an example embodiment of the disclosure. The dashboard 400 can be provided to users via an API and a trend detection engine that is supported by a trained model. For example, a lender can view detected trends for a small business loan applicant who has proposed opening a Mexican restaurant in a particular location.

The dashboard 400 includes a map 402 showing the location of a proposed Mexican restaurant 404 along with the location of nearby similar Mexican restaurants 406, 408, 410, 412. The map 402 can include data from publicly available search engine results.

The dashboard 400 includes a list of similar Mexican restaurants in the proposed location 414. The list of similar Mexican restaurants in the proposed location 414 can provide the names and addresses of the similar Mexican restaurants from publicly available information and can include other data such as data collected from publicly available restaurant rating websites.

The dashboard 400 includes indications of how busy and profitable the similar Mexican restaurants are 416. The lender can see that there are the four nearby Mexican restaurants. If three of them aren't that busy and one chain restaurant seems to have most of the market share, then the proposed Mexican restaurant may not be a good prospect in this location.

The dashboard 400 includes trends for Mexican restaurants in the proposed location 418. The trend detection engine can provide trends based on analyzing transaction data associated with customers who visit the restaurants. The trends can show, for example, that over time three of the four Mexican restaurants have lost sales and revenue after the chain restaurant opened and some of the customers from the other Mexican restaurants started going to the chain restaurant.

The dashboard 400 includes indications of profitability of the proposed Mexican restaurant in the proposed location 420. The trend detection engine can provide estimations of sales and revenue based on transaction data, publicly available market and demographic data and the similarity of the proposed type of restaurant to the other established restaurants of that type in the proposed location. The lender can use this information to help decide whether to grant the applicant's loan or perhaps the lender can talk to the applicant and, if the applicant is open to a different location or different type of restaurant, the lender can use the API to look at alternative scenarios and possibly grant the application with additional information or a modified business plan.

Figure 5:
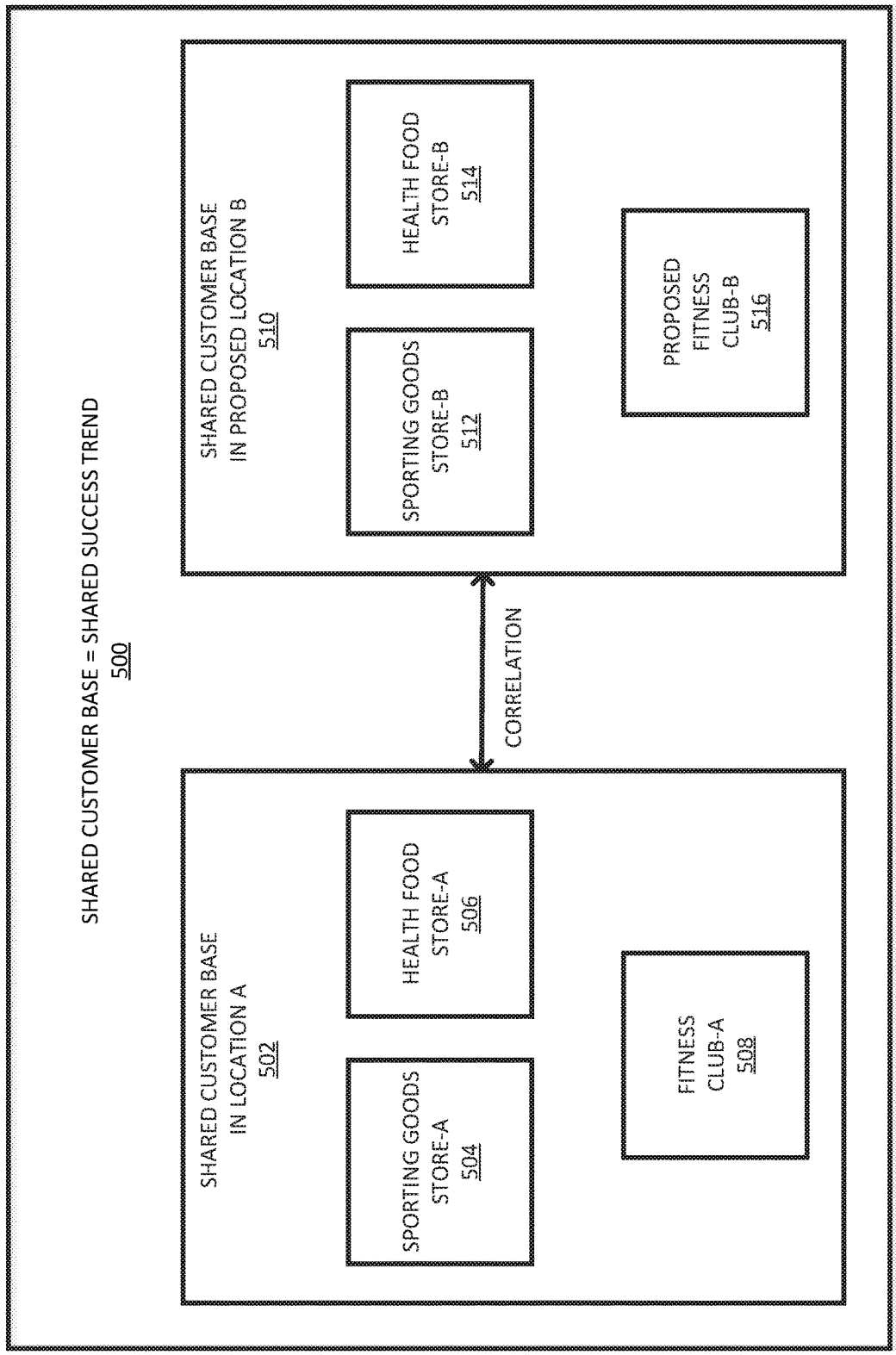
FIG. 5 is a diagram of a dashboard showing detected trends, according to an example embodiment of the disclosure.

FIG. 5 is a diagram of a dashboard 500 showing detected trends, according to an example embodiment of the disclosure. In this scenario, a lender is considering a loan application for a new fitness club in a particular location and the dashboard 500 can help the lender in deciding whether to grant the loan application. The dashboard 500 shows detected trends from a trend detection engine where a shared customer base correlates to shared success. There is a shared customer based in location A 502 for three stores with different business types: a sporting goods store-A 504, a health food store-A 506, and a fitness club-A 508. A correlation was detected between the pattern in location A and a similar pattern in proposed location B by the trend detection engine. There is also a shared customer based in proposed location B 510 for another three stores with the same three business types: a sporting goods store-B 512, a health food store-B 514, and a proposed fitness club-B 516. The lender can use the AI detected pattern matching shown on dashboard 500 to inform his or her decision about a business loan to the proposed fitness club-B 516 that shares a customer base with the sporting goods store-B 512 and the health food store-B 514.

Figure 6:
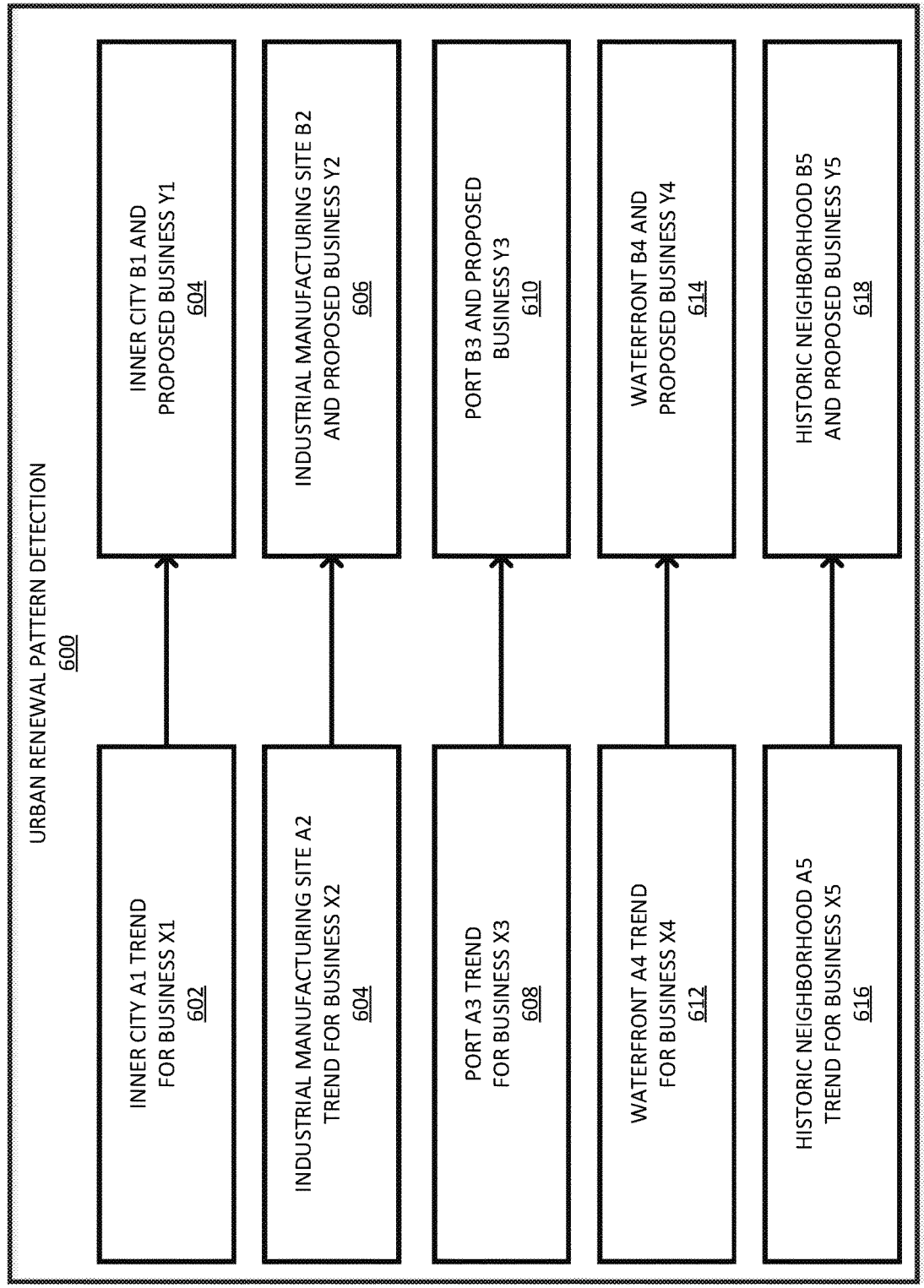
FIG. 6 is a diagram of a dashboard showing detected trends, according to an example embodiment of the disclosure.

FIG. 6 is a diagram of a dashboard 600 showing detected trends, according to an example embodiment of the disclosure. The dashboard 600 shows detected trends for five kinds of urban renewal projects: inner city, industrial manufacturing site, port, waterfront, and historic. The dashboard 600 shows urban renewal pattern detection available to an urban planner via an API from a trend detection engine that is supported by an AI model. The AI model can be trained on publicly available data about urban renewal projects around the world. An urban planner can use the dashboard 600 to help investigate what kinds of urban renewal patterns might be similar to a current rejuvenation project in an urban area where there may be economic incentives for businesses such as tax credits, government subsidies, private investment, bond financing, or loan funding. The urban planner can use the dashboard 600 to evaluate whether a proposed business would qualify for economic incentives.

The dashboard 600 shows a correlation for an inner city kind of urban renewal project. The dashboard 600 shows a trend in an inner city A1 for a business X1 602 that correlates with an inner city B1 and a proposed business Y1 604. The urban planner can use this correlation to investigate whether it is likely in the future that the proposed business Y1 will have the same trend that business X1 did in the past because both were in inner cities and the businesses were similar in some way. The trend or pattern detected can be attracting certain kinds of commercial activity or certain kinds of transactions in the inner city such as attracting commercial office building leasing or people buying tickets to sporting or entertainment events.

The dashboard 600 shows a correlation for an industrial manufacturing site kind of urban renewal project. The dashboard 600 shows a trend in an industrial manufacturing site A2 for business X2 604 that correlates with an industrial manufacturing site B2 and a proposed business Y2 606. The urban planner can use this correlation to investigate whether the same trend for business X2 might hold for proposed business Y2 because both were in industrial manufacturing sites and the businesses were similar in some way. The trend or pattern detected can be an increase in sales and revenue for a certain type of business such as robotics, automation, additive manufacturing, and 3D printing, and an increase in spending for internet of things (IoT) applications.

The dashboard 600 shows a correlation for a port kind of urban renewal project. The dashboard 600 shows a trend in a port A3 for business X3 608 that correlates with a port B3 and a proposed business Y3 610. The urban planner can use this correlation to investigate whether the same trend for business X3 might hold for proposed business Y3 because both were in ports and the businesses were similar in some way. The trend or pattern detected can be reduced sales and revenue for shipping industries or increased sales and revenue for commercial shopping centers and cultural events.

The dashboard 600 shows a correlation for a waterfront kind of urban renewal project. The dashboard 600 shows a trend in a waterfront A4 for business X4 612 that correlates with a waterfront B4 and a proposed business Y4 614. The urban planner can use this correlation to investigate whether the same trend for business X4 might hold for proposed business Y4 because both were in waterfronts and the businesses were similar in some way. The trend or pattern detected can be a rise in container shipping, moving freight handling to less populated venues, synergy for maritime commerce, navigation, and fisheries, and an increase in retail at ferry landings.

The dashboard 600 shows a correlation for an historic neighborhood kind of urban renewal project. The dashboard 600 shows a trend in an historic neighborhood A5 for business X5 616 that correlates with an historic neighborhood B5 and a proposed business Y5 618. The urban planner can use this correlation to investigate whether the same trend for business X5 might hold for proposed business Y5 because both were in historic neighborhoods and the businesses were similar in some way. The trend or pattern detected can be increased demand for renovating, rehabilitating and redeveloping building facades from commercial building owners and tenants and for constructing more low-income housing.

Figure 7:
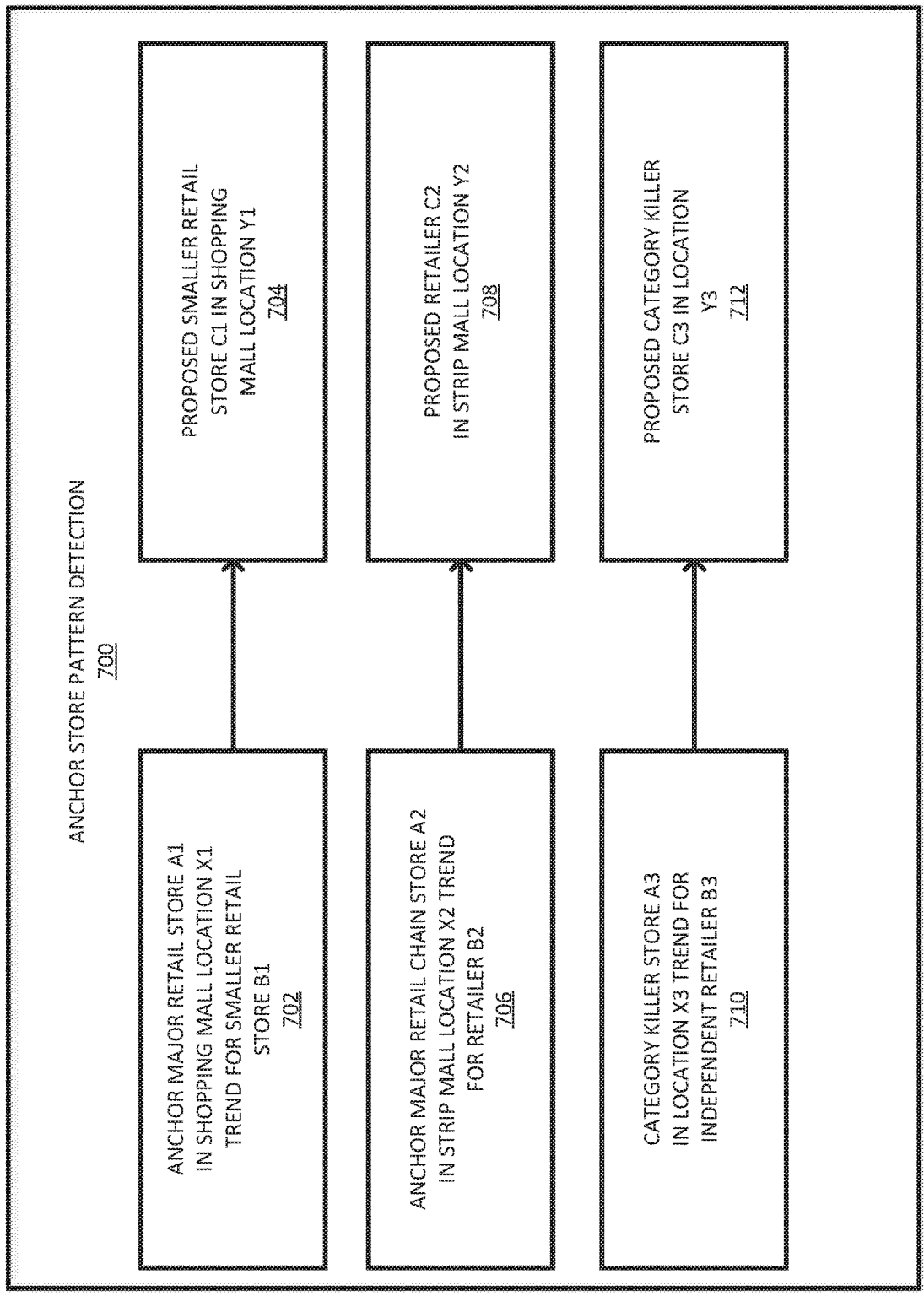
FIG. 7 is a diagram of a dashboard showing detected trends, according to an example embodiment of the disclosure.

FIG. 7 is a diagram of a dashboard 700 showing detected trends, according to an example embodiment of the disclosure. The dashboard 700 shows anchor store pattern detection related to anchor stores. An anchor store in retail is a major retail store used to drive business to smaller retailers usually in a shopping mall or strip mall setting. The larger department stores or grocery stores are generally part of a retail chain and serve as the prominent business in a shopping mall or strip center. Anchor stores have broader appeal than a category killer. A category killer is a retail business that dominates its competition in a product or other stores of its kind. A trend can be a decline in malls, increases in online shopping, and increases in lifestyle centers. A retail developer may use an API to access the dashboard 700 to assess whether a particular development needs an anchor store to be successful and what kinds of businesses might synergistically succeed together. An anchor store provides a foundation for the development and can encourage other retailers to buy or lease commercial space. An anchor store can also draw customer traffic into the smaller stores that surround them. A trend might be smaller stores succeeding when the anchor store succeeds or failing when the anchor store fails.

The dashboard 700 shows an anchor major retail store A1 in shopping mall location X1 trend for a smaller retail store B1 702 correlated to a proposed smaller retail store C1 in shopping mall location Y1 704. The retail developer may use a trend indicating the closure of shopping malls following the bankruptcy of a large department store in planning new development projects. A small retail store business owner can use this trend to decide against locating near particular kinds of large department stores that are likely to go bankrupt.

The dashboard 700 shows an anchor major retail chain store A2 in a strip mall location X2 trend for retailer B2 706 correlated to a proposed retailer C2 in a strip mall location Y2 708. The trend might be that a lifestyle branded grocery store in a strip mall near residential neighborhoods correlates with increased business for businesses like fitness centers and sporting goods stores in the strip mall.

The dashboard 700 shows a category killer store A3 in location X3 trend for an independent retailer B3 710 correlated to a proposed category killer store C3 in a location Y3 712. The trend might be that a category store specializing in a wide selection of merchandise within a given product category such as books, pet supplies, home improvement supplies, or office supplies hurts business for the independent retailer selling goods in the same category. The trend might be that when the category killer store is cheaper, bigger, more convenient and more well-known, it has an advantage over smaller stores and specialty stores.

Figure 8:
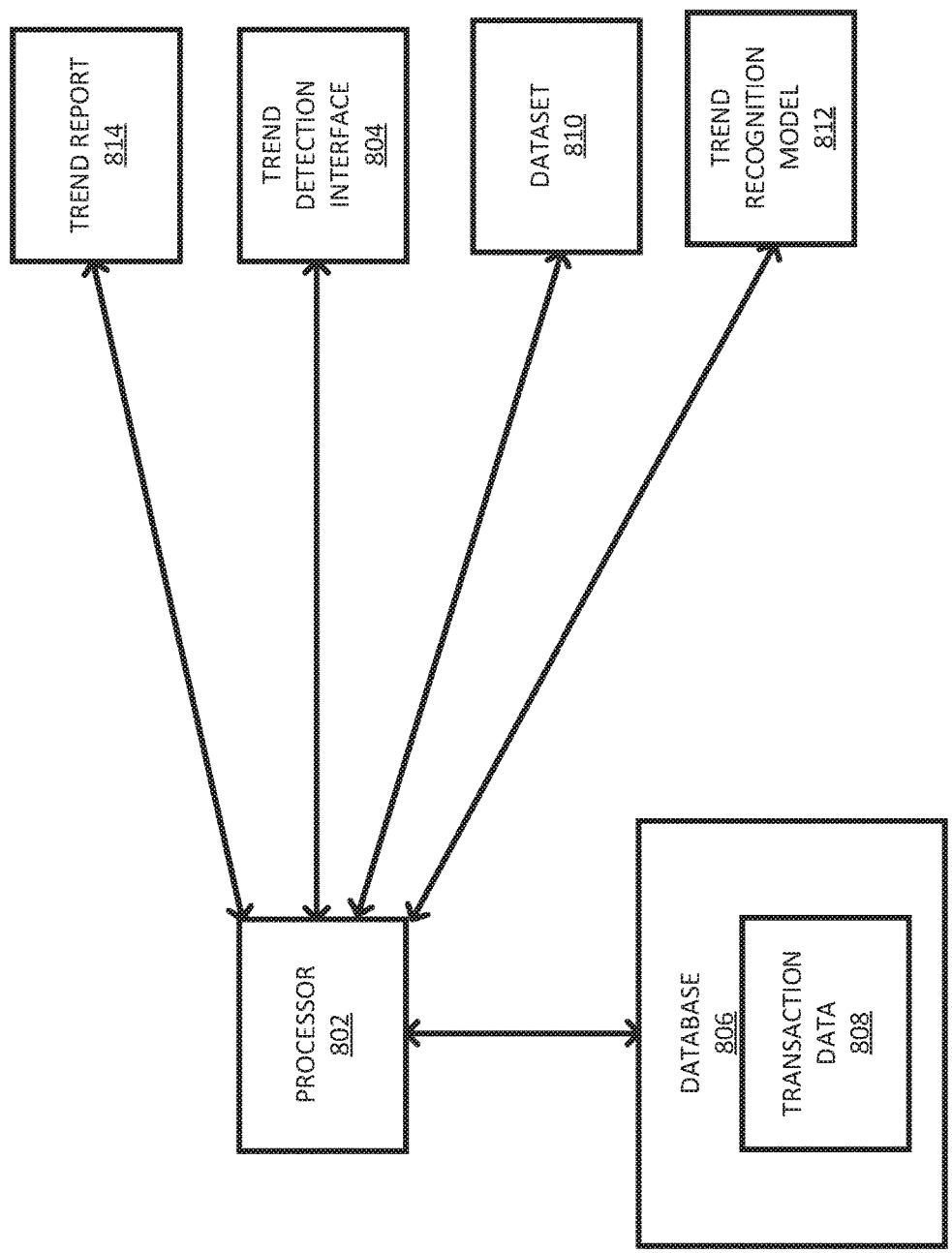
FIG. 8 is a diagram of a system for trend detection, according to an example embodiment of the disclosure.

FIG. 8 is a diagram of a system 800 for trend detection, according to an example embodiment of the disclosure. The system 800 includes a processor 802 and a database 806 that is in data communication with the processor 802. The processor 802 can be part of a network-enabled computer. The database 806 can be any organized data storage such as a relational database system. The database 806 can contain transaction data 808 and other collected data. The transaction data 808 can include a location, a time, a merchant type, and a transaction history longevity from each retailer and other information.

The processor 802 can be configured to provide a trend detection interface 804 and to perform trend detection. The trend detection interface 804 can be an API that is made available to users. A dataset 810 can be selected from the transaction data 808 based on a first business and a first location. A business analyst can use the trend detection interface 804 to detect trends for a business loan applicant who desires to start a new business in a particular location. The dataset 810 can be selected so that the same kind of business or similar businesses in the same or similar locations can be analyzed for matching patterns. The dataset 810 can include retail transaction data, consumer credit data, and business plan data. A trend recognition model 812 can be trained on the dataset 810, where the training includes pattern recognition based on the first business and the first location. The trend recognition model 812 can be trained using supervised or unsupervised learning or a combination of both. The trend recognition model 812 can be any AI model and use various AI methods and techniques such as machine learning, k-nearest neighbors, k-means clustering, naïve Bayes classifiers, random forest, artificial neural networks, and others.

A trend report 814 can be generated using the trend recognition model 812. The business analyst can access the trend report 814 using the trend detection interface 804. The trend report 814 can identify one or more trends associated with the first business and the first location, a measure of similarity between the first business and a second business, and an indication of profitability of the second business. The trends can include a correlation of the first business with a second business and a correlation strength indicator. The indication of profitability can include revenue data, expenditure data, profit margin data, growth data, and other data. The trend recognition model 812 can be configured to compare the correlation strength indicator to a threshold prior to identifying the at least one of the one or more trends in the trend report. The trend report 814 can include an indication of growth of the first business and the second business. The trend report 814 can include a comparison of the first location with a second location.

The business analyst can use the trend report 814 when evaluating the loan applicant of a new business in a particular location by looking at trends for a similar existing business in a similar location. While the trend report may not provide a recommendation, the business analyst can supplement regular business decision making processes with information in the trend report from an AI model that may have detected trends that were impossible for a human being to detect because of the large amount of data and the complexity of the data. Such detected trends that are discovered by the AI model may be surprising or contrary to conventional wisdom or traditional business conventions. An AI model may detect a trend before it reaches a level where it is perceived or recognized by the industry or other communities. Being able to act on detected trends can provide a competitive advantage.

The system 800 can be useful in a scenario where an area is changing and a new business comes into the area. Depending on the type of business, it could have such an impact that it changes the whole character of the area. Some sort of machine learning platform can be used with the trend recognition model 812 to analyze trends across various area to recognize patterns where the new business comes into an area first and then other business do well after they open in the wake of that first business.

The system 800 can be used for many application such as evaluating the risk of small business loans. A lender can use detected trends to help determine whether or not a business is going to be a successful enterprise and whether the lender is likely to get a return on investment for funding some small business to open up in a changing area. A person who wants to start a business can use detected trends to decide where might be a good area to sell certain goods or services. A community planner can use detected trends for information about which kinds of business models are working best in the wake of other businesses in certain kinds of locations. A particular kind of industry such as transportation can use detected trends for help in planning bus, trucking, freight or shipping routes.

The trend recognition model 812 can analyze the transaction data 808 from customers at various businesses to estimate which businesses are successful. If a business is drawing repeat customers and bringing in revenue that is an indication of the success or profitability of the business. However, trends detected from the transaction data 808 may need to be supplemented with information such as market data, demographic data, and whether a business is making sound financial decisions. The trend recognition model 812 can detect a pattern where businesses share customer bases. A complementary transactions kind of trend can be detected where customers buy goods or services from nearby businesses around the same time and correlations can be made between similar businesses and similar areas. Such businesses can help each other grow and revitalize an area. The trend recognition model 812 can discover a leading indicator that a business based in one area would prosper another business. The dataset 810 can be anonymized and detected trends can be generalized in patterns, categories, or types in the trend report 814. The trend recognition model 812 can be any kind of machine learning technique such as generative adversarial structured networks or neural networks that is well suited for complex pattern analysis. The trend recognition model 812 can digest more inputs and discern complex patterns better than humans. A human can take the detected trends and make sense of them in various contexts and application areas such as investment decisions.

The trend report 814 can be a dashboard kind of view of different variables and how different business types historically have affected or predicted success in another place or similar area. The dashboard can include cluster charts resulting from cluster analysis by the trend recognition model 812 such as one that uses k-means clustering. The cluster charts can illustrate which types of businesses perform well near one another and other detected trends and patterns.

The trend recognition model 812 can use either supervised or unsupervised learning. A prototype or temporary supervised model can be cycled on the dataset 810 to determine whether a pattern predicts that a business will be successful using a threshold or some sort of quantification on the output. An unsupervised model can provide a detected pattern from the dataset 810 and predict that a business is likely to make some amount of money. A business analyst can use that detected pattern and prediction to reach their own decision after matching it with other available information. The trend recognition model 812 can use supervised learning for initial trials and switch to unsupervised learning afterwards. The dataset 810 can be varied and switched as well such as varying ranges of historical data.

In system 800, a non-transitory computer-accessible medium can store computer-executable instructions. Upon execution by a computer arrangement such as the system 800 including the processor 802, the instructions can cause the computer arrangement to perform procedures such as a method for trend detection.

Figure 9:
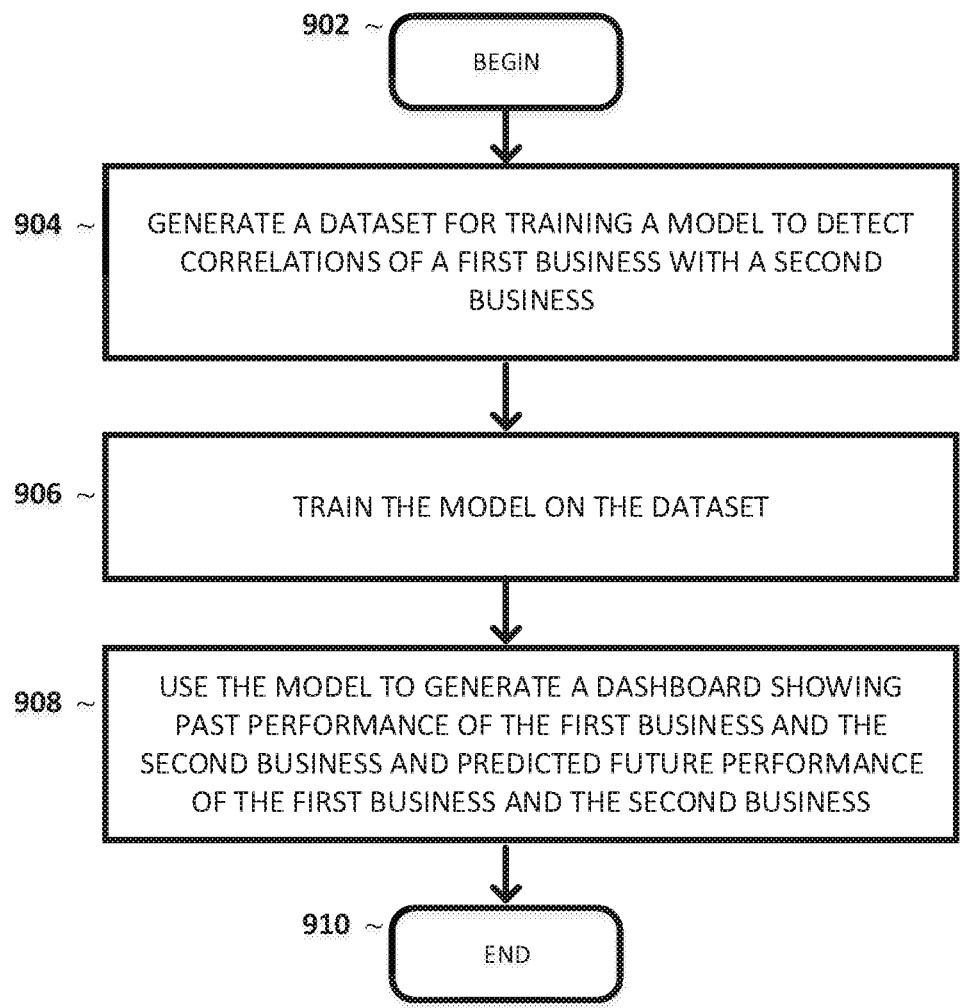
FIG. 9 is a flow chart of a method for trend detection, according to an example embodiment of the disclosure.

FIG. 9 is a flow chart of a method 900 for trend detection, according to an example embodiment of the disclosure. Method 900 beings at block 902. At block 904, a dataset can be generated for training a model to detect a correlation of a first business with a second business. The dataset can include a location, a time, a merchant type, and a transactions history longevity from each retailer. The dataset can be selected from merchant transaction data, location data, consumer credit data, and business plan data. At block 906, the model can be trained on the dataset. The model can be trained using supervised or unsupervised learning. The model can use k-means clustering. At block 908, the model can be used to generate a dashboard. The dashboard can show past performance of the first business and a second business and predicted future performance of the first business and the second business. Method 910 ends at block 910.

Figure 10:
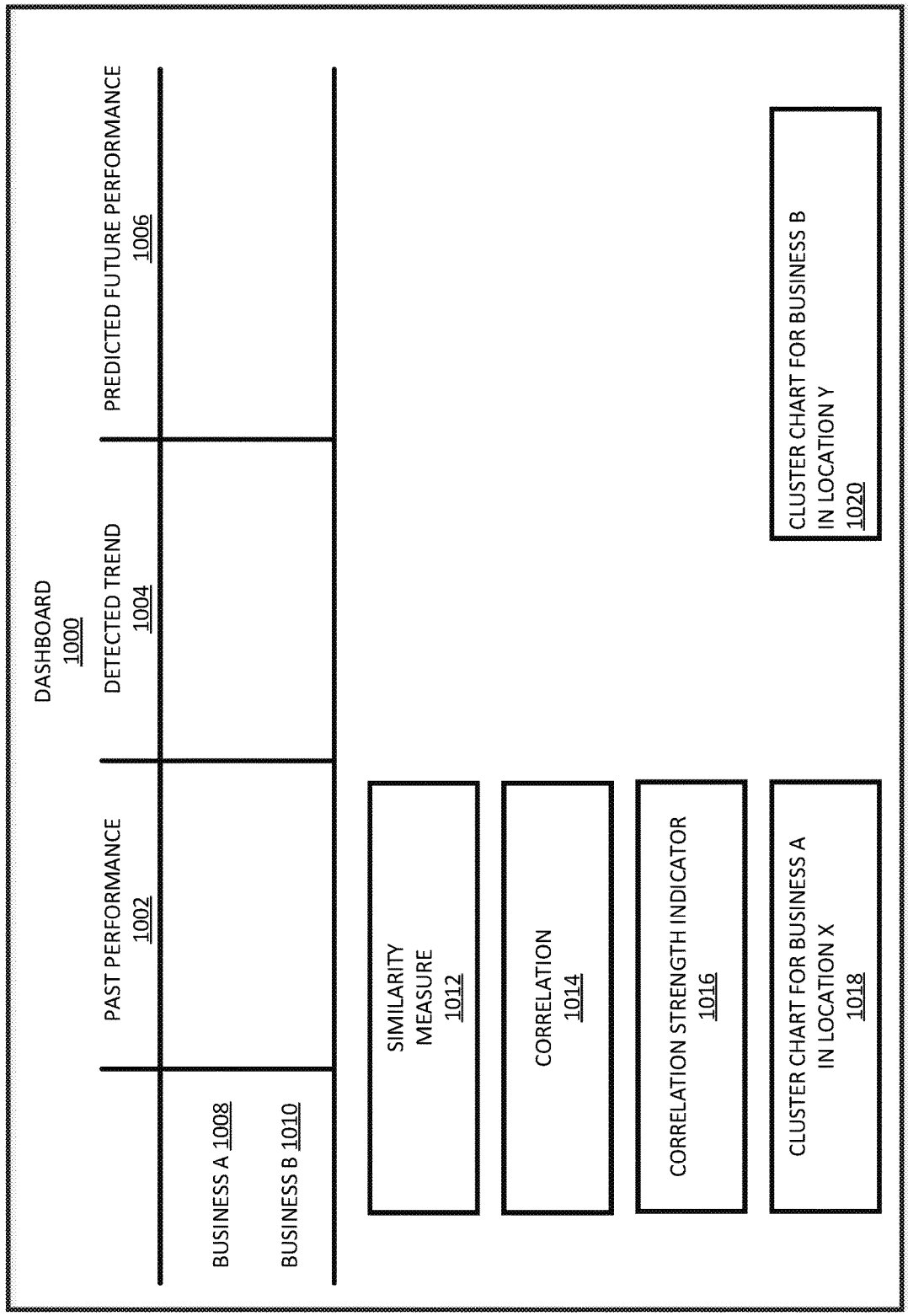
FIG. 10 is a diagram of a dashboard showing detected trends, according to an example embodiment of the disclosure.

FIG. 10 is a diagram of a dashboard 1000 showing detected trends, according to an example embodiment of the disclosure. The dashboard 1000 can show a table with columns for past performance 1002, one or more detected trend 1004, and predicted future performance 1006 for one or more rows of businesses such as business A 1008 and business B 1010. The dashboard 1000 can display the detected trends in many other ways such as category or a narrative description of the detected trend 1004. The dashboard 1000 can show a similarity measure 1008 between the business A 1008 and business B 1010. The dashboard 1000 can show one or more correlation 1014 and a correlation strength indicator 1016 associated with the correlation 1014. The correlation 1014 can be between patterns associated with the detected trend 1004. The correlation 1014 can be between business A 1008 and business B 1010. The dashboard 1000 can show a cluster chart for business A in location X 1018 that correlates to a cluster chart for business B in location Y 1020. The cluster chart for business A in location X 1018 and the cluster chart for business B in location Y 1020 can illustrate the patterns associated with the detected trends and can represent the results of an AI model that uses k-means clustering. Other data visualizations and data representations can be shown on dashboard 1000 for the results from detecting trends using various kinds of AI models and various different AI method and techniques.

The predicted future performance 1006 can include an indication of profitability of business B 1010.

Business A 1008 and business B 1010 can have similar business models. Business A 1008 and business B 1010 can share a customer base in a market. Business A 1008 and business B 1010 can be located in a first area. The past performance of business A 1008 and business B 1010 can be in the first area and the future performance of business A 1008 and business B 1010 can be in a second area.

Figure 11:
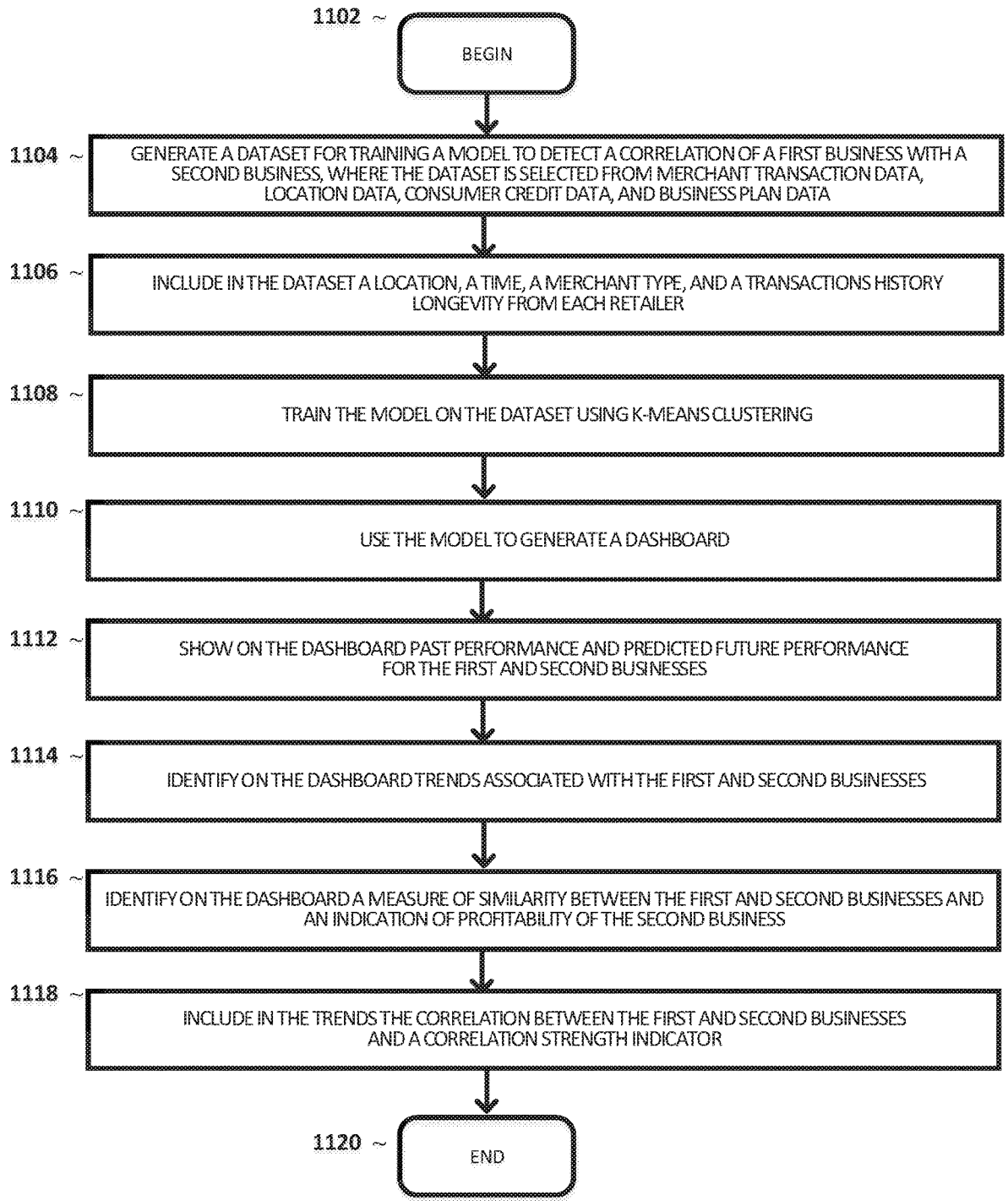
FIG. 11 is a flow chart of a method for trend detection, according to an example embodiment of the disclosure.

FIG. 11 is a flow chart of a method 1100 for trend detection, according to an example embodiment of the disclosure. Method 1100 begins at block 1102. At block 1104, a dataset can be generated for training a model to detect a correlation of a first business with a second business, where the dataset can be selected from merchant transaction data, location data, consumer credit data, and business plan data. At block 1106, the dataset can include a location, a time, a merchant type, and a transactions history longevity from each retailer. At block 1108, the model can be trained on the dataset using k-means clustering. At block 1110, the model can be used to generate a dashboard. At block 1112, the dashboard can show past performance of the first business and the second business and predicted future performance of the first business and the second business. At block 1114, the dashboard can identify one or more trends associated with the first and second businesses. At block 1116, the dashboard can identify a measure of similarity between the first and second businesses and an indication of profitability of the second business. At block 1118, the trends can include the correlation of the first business with the second business and a correlation strength indicator. The method 1100 ends at block 1120.

In method 1100, the first business and the second business can have similar business models. The first business and the second business can share a customer base in a market. The first business and the second business can be located in a first area. The past performance of the first business and the second business can be in a first area and the future performance of the first business and the second business can be in a second area.

For example, method 1100 can detect trends such as a trend that when a sporting goods store is located near a craft beer bar, customers tend to spend a lot more money at both businesses compared to other areas having only a sporting goods store without a craft beer bar nearby. Method 1100 can detect trends, correlations, relationships or patterns that may not be as intuitive as people who like to hike also like to drink beer. Method 1100 can identify less obvious spend relationships. For example, method 1100 can detect trends such as people who go to vitamin shops also like to shop at consignment stores and these two types of businesses have more sales and revenue near each other because of complementary goods or services or shared customer bases or other factors.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it could.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
a processor configured to provide a trend detection interface; and
a database in data communication with the processor;
wherein the processor is further configured to:
collect data from a plurality of data sources to generate a data collection within the database, wherein the plurality of data sources comprise:
transaction data associated with a plurality of transaction, the transaction data comprising location data, bank data, transaction processor data, and merchant data,
business data associated with a plurality of businesses, the business data comprising lender data, specific business data, and business analyst data, and
public data comprising economic cycle conditions,
select a dataset from the data collection based on a first business and a first location,
train a trend recognition model on the dataset, wherein the training includes pattern recognition based on the first business and the first location,
generate a trend report using the trend recognition model, wherein the trend report identifies one or more trends associated with the first business and the first location, a measure of similarity between the first business and a second business, and an indication of profitability of the second business,
apply a trend detection engine to the trend report to generate trend detection interface data for presentation on the trend detection interface, wherein the trend detection interface data comprises a past performance of the first business, a past performance of the second business, the measure of similarity between the first business and the second business, a predicted future performance of the first business, and a predicted future performance of the second business,
communicate the trend detection interface data to the trend detection interface via an application programming interface,
receive feedback data responsive to the trend report,
update the dataset with the feedback data, and
retrain the trend recognition model on the updated dataset,
wherein at least one of the one or more trends includes a correlation of the first business with a second business, a correlation project categorization, and a correlation strength indicator, and
wherein the correlation project categorization comprises at least one selected from the group of an inner city renewal project, an industrial manufacturing site renewal project, a port renewal project, a waterfront renewal project, and a historic renewal project.

2. The system of claim 1, wherein the trend recognition model is trained using supervised learning.

3. The system of claim 1, wherein the trend recognition model is trained using unsupervised learning.

4. The system of claim 1, wherein the indication of profitability includes revenue data, expenditure data, profit margin data, and growth data.

5. The system of claim 1, wherein the trend recognition model is configured to compare the correlation strength indicator to a threshold prior to identifying the at least one of the one or more trends in the trend report.

6. The system of claim 1, wherein the trend report includes an indication of growth of the first business and the second business.

7. The system of claim 1, wherein the trend report includes a comparison of the first location with a second location.

8. The system of claim 1, wherein the dataset includes retail transaction data.

9. The system of claim 1, wherein the dataset includes consumer credit data.

10. The system of claim 1, wherein the dataset includes business plan data.

11. A method, comprising:
collecting data from a plurality of data sources to generate a data collection, wherein the plurality of data sources comprise:
transaction data associated with a plurality of transaction, the transaction data comprising location data, bank data, transaction processor data, and merchant data,
business data associated with a plurality of businesses, the business data comprising lender data, specific business data, and business analyst data, and
public data comprising economic cycle conditions,
selecting a dataset from the data collection based on a first business and a first location,
training a trend recognition model on the dataset, wherein the training includes pattern recognition based on the first business and the first location,
generating a trend report using the trend recognition model, wherein the trend report identifies one or more trends associated with the first business and the first location, a measure of similarity between the first business and a second business, and an indication of profitability of the second business,
applying a trend detection engine to the trend report to generate trend detection interface data for presentation on the trend detection interface, wherein the trend detection interface data comprises a past performance of the first business, a past performance of the second business, the measure of similarity between the first business and the second business, a predicted future performance of the first business, and a predicted future performance of the second business,
communicating the trend detection interface data to the trend detection interface via an application programming interface,
receiving feedback data responsive to the trend report,
updating the dataset with the feedback data, and
retraining the trend recognition model on the updated dataset,
wherein at least one of the one or more trends includes a correlation of the first business with a second business, a correlation project categorization, and a correlation strength indicator, and
wherein the correlation project categorization comprises at least one selected from the group of an inner city renewal project, an industrial manufacturing site renewal project, a port renewal project, a waterfront renewal project, and a historic renewal project.

12. The method of claim 11, wherein:
the trend recognition model executes on an artificial intelligence (AI) infrastructure configured for model tuning, and
the feedback data is received from the AI infrastructure.

13. The method of claim 11, wherein the correlation comprises one or more patterns associated with the first business and the second business.

14. The method of claim 13, wherein the trend detection interface data comprises one or more cluster charts illustrating the one or more patterns.

15. The method of claim 14, wherein the one or more cluster charts comprises a first cluster chart for the first business and a second cluster chart for the second business.

16. The method of claim 14, wherein the one trend recognition model is trained on the dataset using k-means clustering.

17. A non-transitory computer-accessible medium having stored thereon computer-executable instructions, wherein upon execution by a computer arrangement comprising a processor, the instructions cause the computer arrangement to perform procedures, comprising:
selecting a dataset from the transaction data based on a first business and a first location,
collecting data from a plurality of data sources to generate a data collection, wherein the plurality of data sources comprise:
transaction data associated with a plurality of transaction, the transaction data comprising location data, bank data, transaction processor data, and merchant data,
business data associated with a plurality of businesses, the business data comprising lender data, specific business data, and business analyst data, and
public data comprising economic cycle conditions,
training a trend recognition model on a dataset selected from the data collection, wherein the training includes pattern recognition based on the first business and the first location,
generating a trend report using the trend recognition model, wherein the trend report identifies one or more trends associated with the first business and the first location, a measure of similarity between the first business and a second business, and an indication of profitability of the second business,
applying a trend detection engine to the trend report to generate trend detection interface data for presentation on the trend detection interface, wherein the trend detection interface data comprises a past performance of the first business, a past performance of the second business, the measure of similarity between the first business and the second business, a predicted future performance of the first business, and a predicted future performance of the second business,
communicating the trend detection interface data to the trend detection interface via an application programming interface,
receiving feedback data responsive to the trend report,
updating the dataset with the feedback data, and
retraining the trend recognition model on the updated dataset,
wherein at least one of the one or more trends includes a correlation of the first business with a second business, a correlation project categorization, and a correlation strength indicator, and
wherein the correlation project categorization comprises at least one selected from the group of an inner city renewal project, an industrial manufacturing site renewal project, a port renewal project, a waterfront renewal project, and a historic renewal project.

18. The non-transitory computer-accessible medium of claim 17, wherein the pattern recognition includes identifying one or more shared customer bases for the first business.

19. The non-transitory computer-accessible medium of claim 18, wherein the trend report identifies an indication of profitability of the second business associated with the one or more shared customer bases.

20. The non-transitory computer-accessible medium of claim 17 wherein the trend report identifies an indication of profitability of the second business associated one or more complementary goods or services with the first business.

* * * * *